May 28, 1940. M. KLAVIK 2,202,455
BLOWER ARRANGEMENT IN AIR-COOLED MOTORS
Filed Feb. 28, 1939
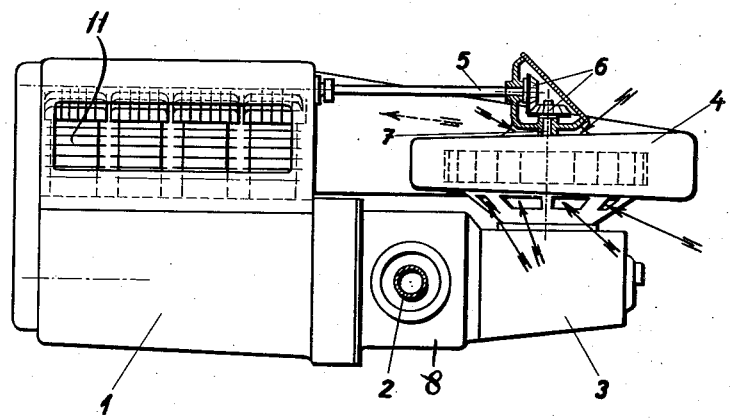
Inventor
Milos Klavik
By Bilinger, atty.

Patented May 28, 1940

2,202,455

UNITED STATES PATENT OFFICE 2,202,455

BLOWER ARRANGEMENT IN AIR-COOLED MOTORS

Miloš Klavík, Prague-Smichov, Czechoslovakia

Application February 28, 1939, Serial No. 259,050
In Czechoslovakia February 4, 1938

2 Claims. (Cl. 123—171)

In air-cooled straight-type motors of automobiles the blower is generally arranged laterally of the motor either in a plane parallel to the cylinders or at right angles to the distribution plane of the cylinders. These arrangements, however, result in a considerable increase in the length or width of the motors and in addition one side of the motor is thus always obstructed by the blower, so that a number of the important components of the motor are only accessible with difficulty.

According to the invention, this disadvantage is obviated by mounting the blower with its casing situated at right angles to the cylinder axes advantageously behind the motor above the change-speed gear, where, particularly in the case of rear motors, there is sufficient free available space and also just at these places the outer fresh air is supplied to the space round the motor in the interior of the automobile body, so that the cool air travels by the shortest path to the suction inlet of the blower.

A constructional example of the invention is shown in the accompanying drawing.

The driving unit which comprises the motor 1, the differential casing 8 containing the drive of the axles 2 and the change speed gear box 3, forms a complete assemblage mounted in the rear part of the automobile body. Above the change-speed gear box 3 is arranged the blower 4 with a vertical axis, the drive of the blower being effected by the extension 5 of the valve cam-shaft, which extends from the tops of the cylinders 11 of the motor to the driving bevel gear 6 and drives the shaft 7 of the blower 4.

It is obvious that the details of the constructional example described may be modified in various ways without departing from the scope of the invention.

I claim:

1. In combination with an air-cooled motor for an automobile with cylinders in line, an overhead valve cam-shaft for the motor, a change-speed gear box attached to said motor, a blower mounted directly on and above said change-speed gear box with its central plane at right angles to the plane of the cylinders and an extension for driving directly the blower from the overhead cam-shaft of the motor, said blower having its air intake adjacent said gear box.

2. In combination with an air-cooled motor for an automobile with cylinders in line, a valve cam-shaft for the motor, a change-speed gear box attached to said motor, a blower mounted directly on and above said change-speed gear box with its central plane at right angles to the plane of the cylinders, said blower having its air intake adjacent said gear box, an extension of the cam-shaft for driving the blower, a bevel wheel at the end of the extension and a bevel wheel on the shaft of the blower, said bevel wheels being in mesh for driving the shaft of the blower at right angles of the extension.

MILOŠ KLAVÍK.